United States Patent [19]

Ducote et al.

[11] Patent Number: 4,751,069
[45] Date of Patent: Jun. 14, 1988

[54] AUTOMOTIVE HIGH COLOR CARBON

[75] Inventors: Rushing E. Ducote, Baton Rouge; Ronald G. Dees, Swartz; Virgil L. Musick, deceased, late of Swartz, all of La., by Doris M. Musick, heiress

[73] Assignee: Columbian Chemicals Company, Atlanta, Ga.

[21] Appl. No.: 5,333

[22] Filed: Jan. 15, 1987

Related U.S. Application Data

[63] Continuation of Ser. No. 374,210, Oct. 18, 1982, abandoned.

[51] Int. Cl.⁴ .............................................. C09C 1/48
[52] U.S. Cl. .................................... 423/450; 106/307; 423/449; 423/458; 423/460
[58] Field of Search ............... 423/450, 458, 460, 449; 106/307; 422/151

[56] References Cited

U.S. PATENT DOCUMENTS

| | | | |
|---|---|---|---|
| 2,781,246 | 2/1957 | Goldtrap | 423/450 |
| 2,943,064 | 6/1960 | Lipkin | 106/307 |
| 3,959,008 | 5/1976 | Warner et al. | 423/450 |
| 4,206,192 | 6/1980 | Austin | 423/455 |
| 4,247,530 | 1/1981 | Cheng et al. | 423/450 |
| 4,288,408 | 9/1981 | Guth et al. | 422/151 |
| 4,460,558 | 7/1984 | Johnson | 423/450 |

OTHER PUBLICATIONS

Handbook of Chemistry, 10th ed. Lange, ed. McGraw-Hill Book Co. 1961, pp. 820-821.

Primary Examiner—John Doll
Assistant Examiner—Jeffrey Edwin Russel
Attorney, Agent, or Firm—Head & Johnson

[57] ABSTRACT

Disclosed is a novel high color carbon black having an electron microscope surface area over 250 m²/g and a nitrogen adsorption surface area between about 240 and about 500 m²/g and a novel furnace carbon black having an electron microscope surface area above 250 m²/g and a nitrogen adsorption surface area below about 800 sq. m/g. Also disclosed is a process for making these high color carbon blacks comprising feeding into a carbon black reactor a carbonaceous feed which is cracked at a high temperature to produce carbon black, wherein the reaction producing carbon black is at least quenched partially by contacting the reaction products directly with an auxiliary fuel taken from the group comprising a high BTU gas and a vaporizable hydrocarbon oil.

9 Claims, 1 Drawing Sheet

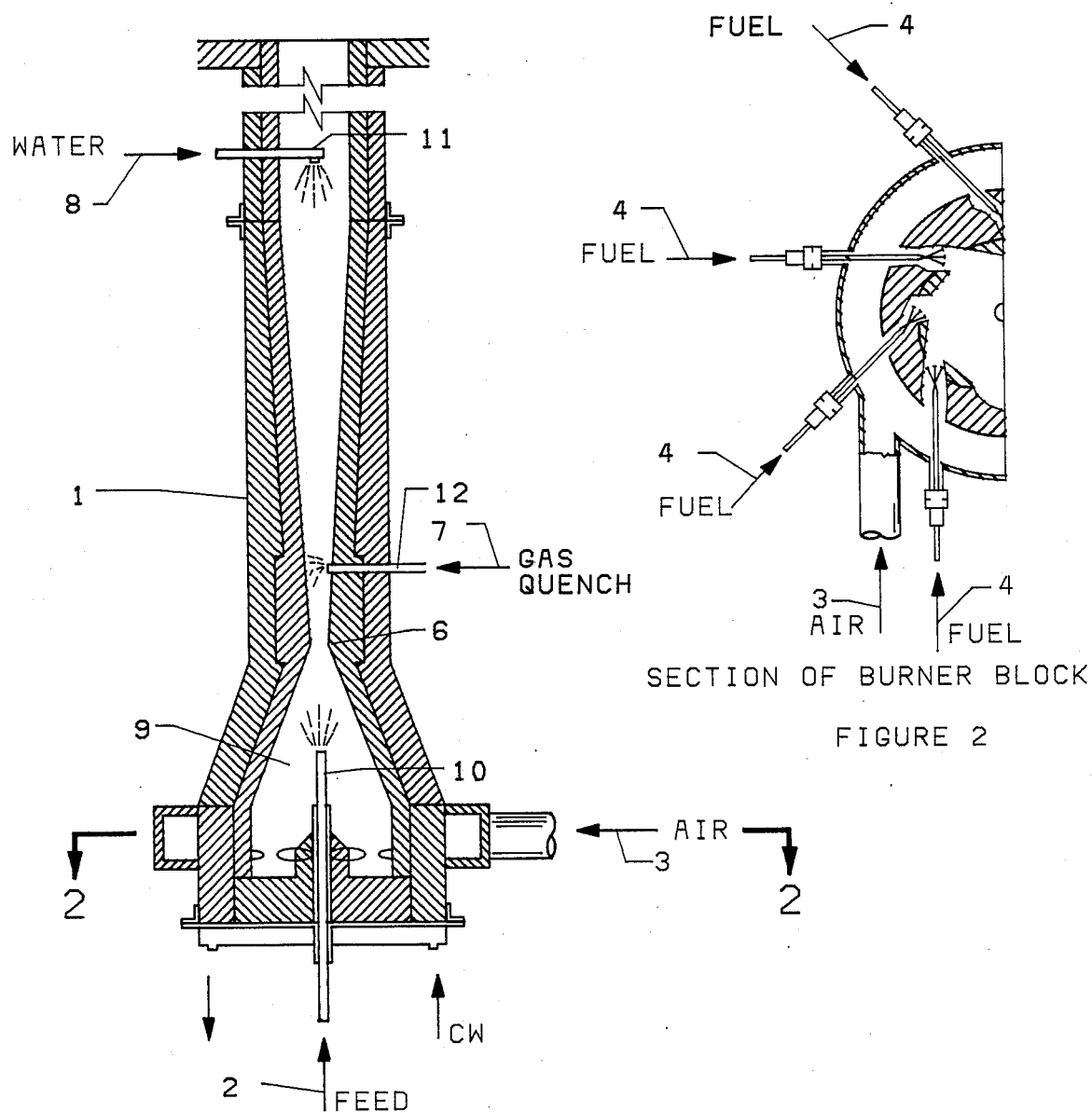

AUTOMOTIVE HIGH COLOR CARBON

This is a continuation application of Ser. No. 374,210, filed Oct. 18, 1982, now abandoned.

This invention relates to a novel high color carbon black and high color furnace carbon black. Further this invention relates to a method of making a class of high color carbon black products which have a large surface area and a low porosity. More particularly, this invention relates to a method of making a class of high color carbon black products which have a large surface area and a ratio of the surface area measured by the electron microscope to that of nitrogen adsorption close to one. These carbon blacks are particularly useful as a color for paints and printing ink formulations, but it is conceivable that these blacks have other uses such as an ingredient in toners for copying machines.

Generally the most desirable property in carbon blacks suitable for paint and ink formulations are high jetness or masstone, good dispersibility and properties which impart low viscosity characteristic to the carrier vehicle. It is believed that a large surface area, small aggregate size and low porosity are the desirable properties for this carbon black.

Heretofore, it has been difficult to produce a carbon black with a combination of a large surface area, small aggregate size and low porosity. That is, it has been acknowledged by those skilled in the art that a significant degree of porosity is always present in carbon black products having a small aggregate size and a large surface area. Low porosity as used herein means a surface area measured by the electron microscope in accordance with ASTM D-3849-80 above about 250 $m^2/g$ and a nitrogen adsorption surface area measured in accordance with ASTM D-3037-78 less than about 800 $m^2/g$.

Techniques have been used in the past to produce a furnace carbon black having some of the characteristics mentioned above by treating the black with water, and dispersing agents or surface active agents as well as oxidizing agents such as ozone, nitric acid, oxygen and air. As a result, to some extent, coloring characteristics and dispersibility have been improved. However, these characteristics have not been improved significantly because of high porosity or large aggregate size.

SUMMARY OF THE INVENTION

It has been found that a significant improvement in the coloring characteristics of carbon black is obtained by the present invention. Accordingly, a novel carbon black is produced having an electron microscope surface area above about 250 $m^2/g$ and a nitrogen adsorption surface area less than about 500 $m^2/g$. A novel oil furnace black is produced having an electron microscope surface area above about 250 $m^2/g$ and a nitrogen adsorption surface area less than about 800 $m^2/g$. These carbon blacks have an ASTM D-3265-80 tint factor between about 145 and about 160 and an ASTM D-2414-79 dibutylphthalate adsorption between about 90 and about 190. This black is treated by an oxidizing agent to contain volatile matter between about 4% and about 20% by weight.

This carbon black is produced in a furnace process using an auxiliary gas at least partially as the primary quench which not only lowers the reaction temperature but also otherwise minimizes porosity of carbon black particles formed in the carbon black reactor. This auxiliary gas is introduced at a point immediately after the carbon black producing reaction is substantially complete and usually downstream of the choke (if present) of the reactor. The carbon black produced is oxidized by methods known in the art, such as with ozone, nitric acid and oxygen containing gases.

BRIEF DESCRIPTION OF THE DRAWINGS

FIG. 1 is a diagram drawing of an oil furnace reactor.
FIG. 2 is a section of the burner block of the reactor of FIG. 1 taken along the line 2—2 of FIG. 1.

DETAILED DESCRIPTION OF THE INVENTION

According to the present invention, a carbon black is produced by feeding into a conventional oil furnace carbon black reactor a carbonaceous feed material known to those skilled in the art. Most often these feedstock are those obtained from catalytic cracking operations from refineries. Preferably, the feedstock is a highly aromatic oil, such as heavy catalytic cracker cycle oil of low API gravity.

The type of reactor utilized can be varied but generally the reactors that provide the high turbulence and the most rapid flow rates are preferred. Also preferred is an operation at relatively high temperatures and relatively short residence times. Accordingly, the air to oil rate will be high, yield will be low and reactor capacity will be low, thus bringing economics to bear. Hence, the temperature should not be too high and the residence time too low.

An auxiliary fuel is used to provide at least a part of the heat for cracking the feedstock. The remainder of this heat, if any, is provided by the feedstock. The fuel will most often be a gas such as natural gas, tail gas from the carbon black process and other gases such as synthetic natural gas.

According to the conventional carbon black process, the fuel is mixed with with air or some other oxygen containing gas and burned in the "blast" section of the reactor to produce hot combustion gases (blast) with which the feedstock is mixed to produce the carbon black.

Downstream of this blast section is a "choke" which is a restriction such as a section smaller in size than the blast section. Feedstock is fed 0-6" upstream of this choke. This choke provides the high turbulence necessary for making a high surface area carbon black such as that of the present invention. However, in some cases the choke may not be necessary where high turbulence is otherwise provided. It is preferred that this choke be present in the reactor which makes high surface area carbon black according to the present invention. Other modifications of the reactor are possible such as changing the internal configuration, e.g., different choke location, combustion chamber configuration, etc., or by changing operating conditions, e.g., feed spray location, quench location, addition of additives, etc. These are well known in the art.

According to the present invention, an auxiliary fuel taken from the group comprising a hydrocarbon gas higher than about 100 BTU and a vaporizable hydrocarbon oil is injected downstream of the choke (when the choke is immediately after the blast section) or at least downstream of the point of highest turbulence and beyond the point where cracking of the feedstock into carbon black begins. By a high BTU gas, (with a high carbon to hydrogen ratio e.g. natural gas, methane, ethane, butane), it is meant a hydrocarbon gas having a BTU, stated as calorific value per standard cubic foot above about 100 and preferably above about 500 BTU and even more preferably between about 900 and about 1100 BTU. By a vaporizable hydrocarbon oil it is meant an oil which has a BCMI between about 100 and about 150 and preferably between about 100 and 120 (with a low boiling point).

The point at which this fuel is injected is determined by many factors, some of which are mentioned above. In any event, this auxiliary fuel acts at least partially as a primary quench and is preferably introduced at a point where the carbon black forming reaction is substantially complete, e.g., between about 3 inches and about 10 inches downstream of the choke and downstream of the point where the gas turbulence is near its maximum. By the carbon black forming reaction being substantially complete, it is meant that the carbon black has obtained substantially the aggregate particle size mentioned above which are desired for high coloring characteristics for paints, inks and other similar applications.

The amount of auxiliary fuel injected is that which is sufficient to terminate substantially and abruptly the carbon black forming reaction where the electron microscope surface area of the carbon black is preferably greater than 250 m$^2$/g and the nitrogen absorption surface area of the carbon black is preferably between about 240 and 500 m$^2$/g. Further, the ratio of the electron microscope surface area to the nitrogen adsorption surface area is preferably between about 0.85 and about 0.55 and more preferably between about 0.55 and 0.60, to insure that the carbon black has low porosity. The reactants are cooled in this primary quench to between about 1200° F. and about 1400° F.

As used herein, measurement of the electron microscope surface area is in accordance with ASTM Procedure D-3849-80. The carbon blacks are analyzed in the dry state using dispersion procedure A. The measurements are carried out with an on-line Electron Microscope Image System (Quantimet 720 ®) operating in a feature-specific mode. The magnification (monitor) is set at 190,000 X. The A and P values are number average results which are based on measurements of over 50 different samples. The results on each sample were based on aggregate counts of 2000 or more. The normalization step (11.6) was not used (see note 13 is ASTM D-3849-80).

The manner in which the primary quench nozzle is directed may vary, e.g., upstream, downstream, radially or at an angle. The auxiliary fuel primary quench may be supplemented with heat exchangers, cool smoke, inert gases or even water. The quench may also be staged. Ultimately, the reaction products are finally quenched, however, and the rate or manner in which this is done is not important and may be done by a variety of methods known in the art.

It is not known but it is thought that the auxiliary gas primary quench gas is cracked along with the feedstock and "plate" the carbon black aggregate to reduce its porosity. Accordingly, the surface of the carbon black is made smooth. This condition facilitates the oxidizing steps to follow. By having a smooth surface it is believed that volatiles formed from oxidation of the carbon black will be more functional as an aid in dispersibility, vehicle viscosity, etc.

The carbon black is oxidized to form volatiles on its surface from about 4% to about 20% by weight. This can be done by methods well known in the art such as with ozone, nitric acid, oxygen and other oxidizing agents. The surface of the carbon black of the present invention is especially suited for oxidation to a high weight percent volatile.

Downstream handling of this carbon black is done by conventional methods of conveying, densifying, pelletizing, drying, etc.

EXAMPLE

Reference is made to FIG. 1 which shows a cross-section of a reactor 1 capable of making a high surface area carbon black. A carbon black according to the present invention was made by feeding a heavy catalytic cracker cycle oil feedstock 2 through make spray 10 at a rate of 5.42 gallons per hour into combustion section 9 where a hot blast produced from air 3 and fuel 4 (natural gas) (see FIG. 2) cracks the feedstock 2 to make carbon black. A 13/1 blast ratio of air to fuel was used. The make spray position was 3.5 inches upstream from the choke 6.

The cracking of the feedstock 2 to carbon black was stopped by a rapid auxiliary natural gas quench 7 through spray 12 at a rate of 139 standard cubic feet per hour. This made a total blast ratio of 11.4/1. Water cutoff 8 through spray 11 at a rate of 27.3 gallons per hour finally quenched the reaction. Spray 11 was located 57 inches from choke 6.

This product was treated with nitric acid on a batch basis to a 11% volatile by weight. Other properties of the carbon black produced were the following:

| TINT[1] | 147.2 |
|---|---|
| DBP[2] | 141 |
| N$_2$[3] | 479 |
| EMSA[6] | 306 |
| Mass Color[5] | +16 |
| 20° Gloss[4] | 81.6 |
| Brookfield Viscosity (CPS) | |
| 20° C. | 635 |
| 50° C. | 542 |
| 100° C. | 466 |

[1] ASTM D-3265-80
[2] Dibutylphthalate adsorption
[3] Nitrogen surface area
[4] ASTM D-523 specular gloss
[5] Mass color based on a 20% by weight carbon black loading in an isophatalic alkyd vehicle as compared to DEGUSSA FW-200 TM carbon black in the same system where 1 mass color shade is the least distinguishable difference observable with the human eye.
[6] $EMSA = \frac{K \times P}{D \times A}$, where
K is a constant = 3200
D is the carbon black density (a value of 1.80 g/cc was used)
A is the average aggregate projected area
P is the average aggregate perimeter; and where these quantities are measured in accordance with ASTM D-3849-80 as described above.

What is claimed is:

1. A method of making a low porosity carbon black comprising:
   (1) feeding into a carbon black reactor a carbonaceous feed;
   (2) contacting the feed in the reactor with combustion gases containing oxygen thereby cracking the feed to produce carbon black; and
   (3) contacting the produced carbon black in the reactor with vaporizable hydrocarbon oil injected into the reactor at a point where the carbon black forming reaction is substantially complete to at least partially quench the carbon black producing reaction, the vaporizable hydrocarbon oil being cracked and serving to plate the carbon black to reduce the porosity thereof.

2. The method of making low porosity carbon black according to claim 1 wherein in step (1) the carbon black reactor has an area of maximum gas turbulence and wherein in step (3) the vaporizable hydrocarbon oil contacts the produced carbon black in the reactor downstream of said area of maximum gas turbulence.

3. The method of making low porosity carbon black according to claim 2 wherein said vaporizable hydrocarbon oil is injected into the reactor between about 3 inches and about 10 inches downstream of the point of maximum turbulence.

4. The method of making of making low porosity carbon black according to claim 1 wherein the carbon black reactor has a choke therein and wherein said vaporizable hydrocarbon oil is injected into the reactor downstream of the choke.

5. The method of making low porosity carbon black according to claim 4 wherein the vaporizable hydrocarbon oil is injected into the reactor between about 3 inches and about 10 inches downstream of the choke.

6. The method of making a low porosity carbon black according to claim 1 wherein the amount of vaporizable hydrocarbon oil injected into the reactor is sufficient to substantially terminate the carbon black forming reaction where the carbon black has an electron microscope surface area greater than 250 $m^2/g$.

7. The method of making a low porosity carbon black according to claim 1 wherein the quantity of vaporizable hydrocarbon oil injected into the reactor is sufficient to cool the reactants to between about 1200° F. and about 1400° F.

8. The method of making a low porosity carbon black according to claim 1 including, after step (3):
   injecting water into the reactor as a final quench of the products of combustion.

9. The method of making a low porosity carbon black according to claim 6 where the carbon black has a nitrogen adsorption surface area between about 240 and 500 $m^2/g$.

* * * * *